(No Model.)
E. THOMSON.
METHOD OF ELECTRIC WELDING.
No. 375,022. Patented Dec. 20, 1887.
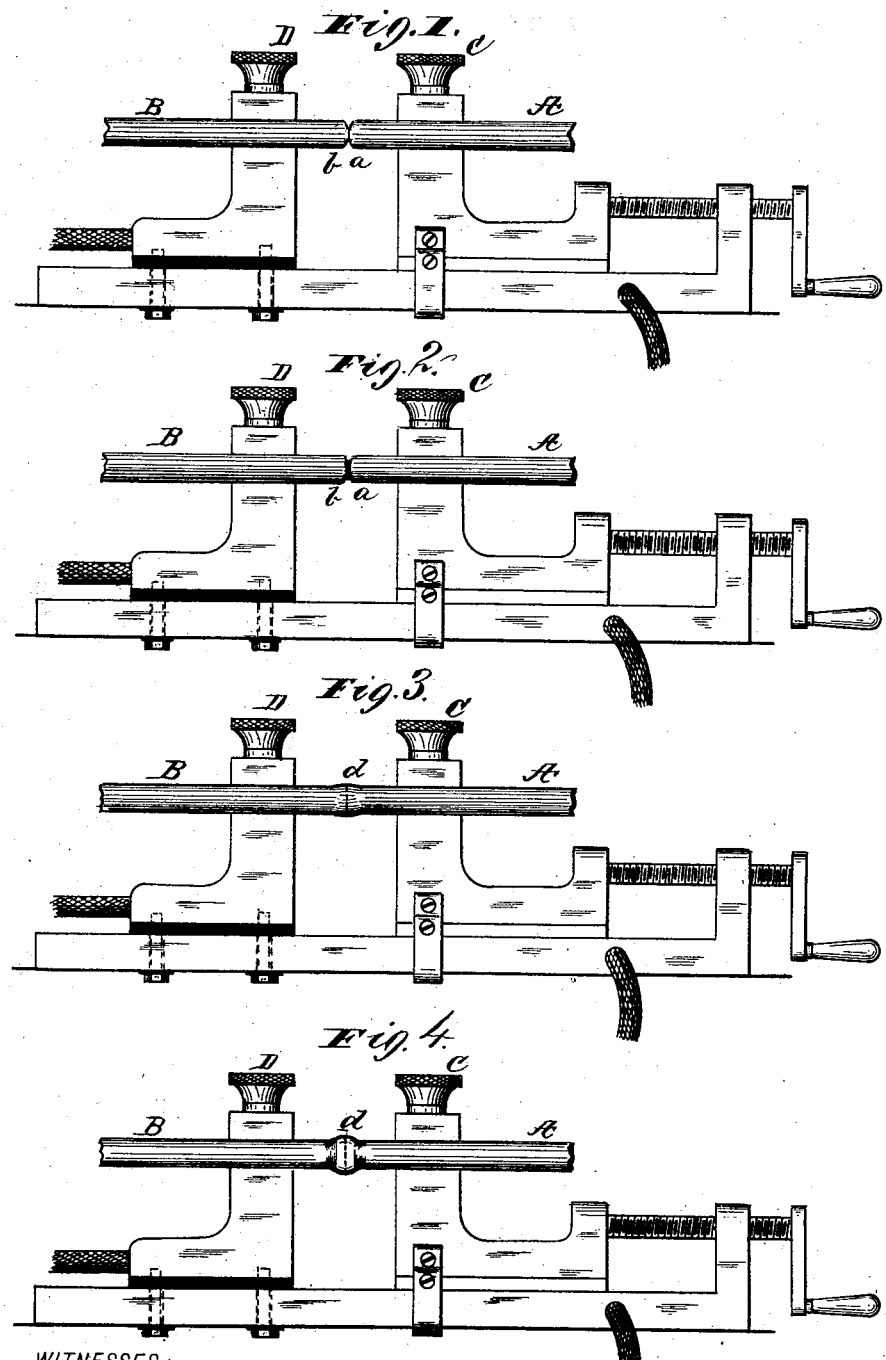

UNITED STATES PATENT OFFICE.

ELIHU THOMSON, OF LYNN, MASSACHUSETTS.

METHOD OF ELECTRIC WELDING.

SPECIFICATION forming part of Letters Patent No. 375,022, dated December 20, 1887.

Application filed August 10, 1887. Serial No. 246,555. (No model.)

*To all whom it may concern:*

Be it known that I, ELIHU THOMSON, a citizen of the United States, and a resident of Lynn, in the county of Essex and State of Massachusetts, have invented a certain new and useful Improved Method of Electric Welding, of which the following is a specification.

My invention relates to a particular method of welding metals by the electrical process, and has for its object the formation of a more perfect union of the metals to be united than can otherwise be effected.

In Letters Patent Nos. 347,140, 347,141, and 347,142, already granted to me, I have described the process of and apparatus for electric welding whereby the same or different metals may be readily united, so as to form strong and firm joints between them.

The present invention relates to improvements which I have introduced into the practice of electric welding, whereby greater facility of work and greater uniformity of result are obtained.

My invention consists, briefly speaking, in forcing the pieces to be welded together with a moderate pressure and passing the electric current through the joint for a sufficient time to raise the parts to a welding temperature at the portions abutting and then increasing the pressure to form the weld.

My invention consists, further, in maintaining the initial pressure for a sufficient length of time to permit incipient welding and then increasing the force with which the pieces are pressed together, so as to complete the welding.

My invention consists, also, in tapering or rounding the abutting portions of the two pieces, so as to diminish or entirely eliminate the burr or expansion at the joint.

In the operation of electric welding as ordinarily practiced the condition of the ends of the pieces to be welded is such as to prevent perfect contact over the whole section of the pieces at the points of abutment, and as a consequence the point of contact on the ends of the abutted pieces where the contact is perfect will be the first to be heated. Now, in order that there may be a perfect union of the pieces to be welded it is necessary that they be at the welding temperature throughout their whole transverse sections at the same time. To insure this condition I have found it best to press the pieces together with such a force, moderate in amount, as will cause a good electrical contact and permit the ends of the pieces to be heated uniformly throughout. At this point of the welding method the pressure need not be increased, but may be maintained until the pieces are at the welding temperature, and until there is a flow or an incipient formation of the joint between the metals at the point of abutment. When this stage of the method is reached, increased pressure is put on to force the pieces tightly together, and the joint is thus completed. The pressure forces the pieces firmly together, insuring perfect union.

In the accompanying drawings, Figure 1 represents in side elevation an apparatus that may be employed in practicing my invention, the pieces to be welded or joined being shown inserted in the clamps and in contact with one another. Fig. 2 represents the condition of the pieces to be welded after they have become thoroughly heated, and so that the joint has begun to be formed. Fig. 3 represents the effect produced by the application of increased pressure when the abutting ends of the two pieces are tapered or rounded prior to the application of the current. Fig. 4 represents the effect of the increased pressure when the bars or pieces to be welded are of ordinary form.

D C indicate the clamps, which are preferably of conducting material and are adapted to hold or clamp the two rods, bars, or pieces A B. The clamp D is mounted upon a support which is suitably insulated from its base, while the clamp C is mounted on a movable support that slides on the base and may be forced toward clamp D by the operation of a screw, as indicated. Electric current is conveyed through the clamps and to the bars by the attachment of electric conductors leading from any suitable source, as described more particularly in my patents before referred to.

The pieces A B, having been placed in the clamps, are moved into contact with one another by the operation of the screw, and are pressed together with a moderate degree of pressure—sufficient to insure good contact. The current is then applied, and the bars are allowed to heat until their abutted portions become uniformly heated, as indicated by the dark shading at the ends $a$ $b$, Fig. 2. This heating being continued until there is an incipient formation of the joint, as also indicated in such figure, an increased pressure is then applied by means of the screw, and the completed joint, as indicated in Figs. 3 and 4, is formed.

The special advantage of my improved method of welding is that it heats the smallest possible portions of the pieces to be welded, consequently giving less bulging or burr at the junction, yet effecting welds or unions practically perfect.

In order to diminish the burr or bulge at the point of junction, I propose to round or taper the ends of the pieces to be welded where they abut prior to the application of the welding-current. It is possible by careful attention to this point to make a joint by the method hereinbefore described in which there shall not be any bulge or expansion whatever, and an ordinary degree of bevel or taper at the end may be made to produce a weld in which the bulge or expansion shall be no more than is represented in Fig. 3.

What I claim as my invention is—

1. The described improved method of welding by the electric process, consisting in abutting the pieces to be welded, applying a moderate pressure to force them together, passing the welding-current through the junction of the pieces, and subsequently to an incipient welding, increasing the pressure, thereby perfecting the joint or weld between the pieces.

2. The herein-described improvement in electric welding, which consists in forcing the pieces of metal to be welded together under moderate pressure and passing the electric current through them until incipient welding takes place, and then increasing the pressure to perfect the joint, as and for the purpose described.

3. The herein-described improvement in electric welding, which consists in tapering or rounding the pieces to be welded at the point of abutment previously to the application of the electric current.

4. The herein-described improvement in electric welding, which consists in forcing the pieces to be welded together with a moderate pressure, maintaining such pressure while the electric current is passed over the joint for a sufficient time to permit the material to become thoroughly heated, and then increasing the pressure to form the weld.

Signed at Lynn, in the county of Essex and State of Massachusetts, this 27th day of July, A. D. 1887.

ELIHU THOMSON.

Witnesses:
  E. WILBUR RICE, Jr.,
  OTIS K. STUART.